United States Patent [19]

Han

[11] 4,395,266

[45] Jul. 26, 1983

[54] STABILIZED WATER-IN-MINERAL OIL EMULSION

[75] Inventor: Kong W. Han, Oosterhout, Netherlands

[73] Assignee: Internationale Octrooi Maatschappij "Octropa" B.V., Rotterdam, Netherlands

[21] Appl. No.: 150,827

[22] Filed: May 19, 1980

[30] Foreign Application Priority Data

May 21, 1979 [NL] Netherlands ..................... 7903961

[51] Int. Cl.³ .............................................. C10C 1/32
[52] U.S. Cl. .......................................... 44/51; 44/60
[58] Field of Search ..................... 44/51, 60; 252/309

[56] References Cited

U.S. PATENT DOCUMENTS

| | | | |
|---|---|---|---|
| 2,802,531 | 8/1957 | Cardwell et al. | 252/8.55 R |
| 3,876,391 | 4/1975 | McCoy et al. | 44/51 |
| 4,022,699 | 5/1977 | Holm | 252/309 |
| 4,032,628 | 6/1977 | Papantoniou et al. | 252/309 |

Primary Examiner—Charles F. Warren
Attorney, Agent, or Firm—Barry Kramer

[57] ABSTRACT

A stabilized water-in-mineral oil emulsion containing a finely divided stabilizer which is substantially undissolved in the constituent phases of the emulsion and forms an interface between said phases. The emulsion is produced starting from water, mineral oil, a surfactant and a stabilizer, which is preferably formed in situ.

The emulsion can be used as fuel and displays an improved combustion.

15 Claims, 4 Drawing Figures

STABILIZED WATER-IN-MINERAL OIL EMULSION

The invention relates to water-in-mineral oil emulsions and to a process for producing such emulsions.

By the term mineral oil is to be understood throughout the specification mixtures of light hydrocarbons such as gasoline, as well as mixtures of heavier hydrocarbons such as kerosine, diesel oil, marine diesel oil, fuel oil and residual fuel oil.

It is known that in combustion processes the use of water-in-mineral oil emulsions has many advantages over the use of pure mineral oil. For instance, the presence of water results in a reduced peak combustion temperature and a more uniform and complete combustion process. In consequence an improvement in the efficiency of the fuel used is achieved while the combustion gases will contain fewer harmful constituents, such as nitrogen oxides and carbon monoxides. When used in internal combustion engines, premature combustion causing "knocking" of the engine will be avoided. To have the advantage of the aforesaid beneficial effects, it has been proposed to emulsify the water in the oil immediately before the combustion by way of injection. It proved to be difficult to obtain a homogeneous emulsion in this manner, while moreover special provisions in the combustion system or in the engine will be required.

Therefore, there is a need for an emulsifier system suitable for use for the production in advance of stable emulsions. Trials were made to meet this need and emulsifier systems were proposed which usually comprised an ionic, mostly an anionic and a nonionic emulsifier. It was however found that the stability of the emulsions was unsatisfactory, unless an amount in the order of 5% by weight or more, which is uneconomical, is added.

Applicants have found stable water-in-mineral oil emulsions (hereafter referred to as W/O emulsions) comprising 1–50% by volume, preferably 5–25% by volume of water, 99–50% by volume, preferably 75–95% by volume of oil, an effective amount of a surface-active material and as a further ingredient a stabilizer which is present in a finely divided solid state at the interface between water and oil and which consists of a compound comprising at least one polar group having a dipole or being capable of forming a hydrogen bridge, and at least two non-polar hydrocarbon groups each having at least eight carbon atoms.

The stabilizer forms, as it were, a skin of fine particles around the emulsified water droplets. The stabilizer suitable for use in the process according to the invention is a compound which is preferably amorphous and shows no tendency to form large crystals.

The average particle size of the stabilizer should preferably not exceed 1/100 of the average particle size of the water droplets. Preferably the average particle size ranges between 1/100 and 1/1000 of the average particle size of the water droplets which is within the range from 0.1 to 25 microns, preferably 1 to 5 microns. Physical measurements carried out with the emulsions according to the invention indicated a negligible interface tension between the water phase and the oil phase. Measurements of the particle size were carried out by means of light absorption (HIAC apparatus) and microscopy (Zeiss apparatus) and indicated in most instances an average diameter of about 2 to 3 microns. In view of the low surface tension it will be understood that simple agitation or stirring will already suffice to obtain a satisfactory emulsion with the emulsifier systems to be disclosed later in the specification. Therefore, the use of the well-known homogenizing techniques including high shear stirring (homogenization) or ultrasonic homogenization, it superfluous. In order to obtain stabilizer particles of such a small size, the stabilizer is preferably formed in situ.

In principle the in situ formation of the stabilizer can be achieved by either of the following procedures:

(I) The stabilizer can be dissolved in either of the phases of the emulsion or in the final W/O emulsion, optionally applying heating, followed by cooling to the temperature at which the stabilizer will separate in a solid state and will migrate to the interface between oil and water.

(II) The stabilizer can be formed by the reaction of two or more reactants which have been previously dissolved in the separate phases, the reaction being achieved for instance by bringing the two phases into contact with each other preferably under stirring.

Procedure II is preferred in those cases where a highly inflammable oil should be heated to dissolve the stabilizer.

As indicated already, the stabilizer compound comprises at least two non-polar hydrocarbon groups having at least 8 carbon atoms. Said non-polar groups are preferably alkyl groups, either branched or unbranched.

Preferably those compounds are used which are obtained by reacting a fatty acid and a compound containing at least two amino groups, whereby for instance a di- or triamide is formed.

Of this type of compounds the fatty acid diamides derived from ethylene diamine are of special importance. The fatty acids used in this process can be synthetic fatty acids or natural fatty acids, such as those derived from vegetable or animal oils e.g. soybean oil, rapeseed oil, palm oil, coconut oil, tall oil, tallow oil or marine oil.

Other stabilizer compounds which yielded good results include compounds obtained by reacting an anionic surfactant and a cationic surfactant. The anionic surfactant to be used preferably comprises mono-, di- or trialkanolamine soaps, for instance ethanolamine soaps. The anion present in these soaps can be derived from one of the fatty acid sources defined above. The cationic surfactant preferably comprises a quaternary ammonium salt, one of the substituents of which contains at least 8 carbon atoms, preferably from 8 to 24 carbon atoms, while the remaining substituents may comprise alkyl groups containing 1 to 3 carbon atoms. The excellent stability resulting from the use of the reaction product obtained by reacting an anionic surfactant and a cationic surfactant is very surprising, since so far these surfactants were believed to be incompatible (cf. for instance Kirk Othmer, Encyclopedia of Chemical Technology, Vol. 8 (1965) p. 127 or U.S. Pat. No. 3,876,391, column 4, lines 32-36).

Also polymers can suitably be used as stabilizers. An example of a suitable polymer includes a composition obtained by reacting maleic acid anhydride and a $C_{18}$ olefin to form a polyalkyl anhydride, which polyalkylanhydride can then be reacted with, for instance, a diamine, preferably ethylene diamine.

The stabilizers according to the present invention are preferably free from ash-forming components. Consequently, the use of substances containing metal ions such as sodium or potassium is avoided.

According to the invention the stabilizers are used in an amount preferably ranging from 0.1 to 2% by weight.

The nature of the surfactants to be used in the emulsions according to the invention is not very critical. Their function is to decrease the surface tension at the water/oil interface in order to allow the ready preparation of a suitable emulsion. In each specific case the most suitable surfactant can be selected from the anionic, cationic or nonionic compounds mentioned, for example, in McCutcheon's Detergents and Emulsifiers (Allied Publishing Corp., New Jersey, U.S.A.).

The surfactant can advantageously be one of the surfactants used for the preparation of the stabilizer. When one of the reactants is present in an amount in excess of that stoechiometrically required, said excess may function as the surfactant.

The surfactant is present in the emulsions according to the invention in an amount of, for instance, 0.1 to 2% by weight.

The stabilized emulsions according to the invention show no phase separation and remain stable after prolonged storage, in contrast to insufficiently stable emulsions which show a distinct separation of clear oil over a creamy deposit at the bottom of the mixture.

In engine tests carried out with water-in-gasoline emulsions according to the invention improvements in efficiency of the fuel were observed ranging from 5% for emulsions containing 5% water to as much as 15% for emulsions containing 20% water. Also, earlier findings were confirmed which showed that the combustion gases had lower contents of nitrogen oxides, carbon monoxide and hydrocarbons.

The invention will now be illustrated in the following Examples.

EXAMPLE 1

Preparation of the Stabilizer

A di-fatty acid diamide was prepared by reacting rapeseed oil with ethtylene diamine. The reaction equation is

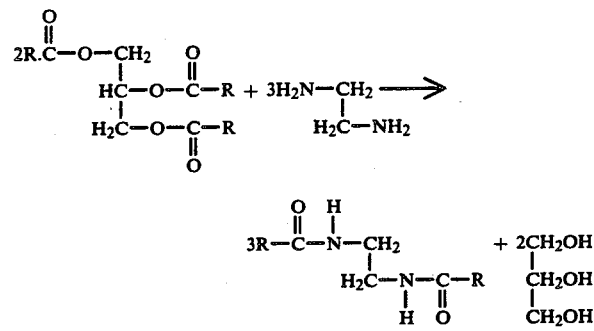

The stabilizer was prepared in accordance with the following recipe: 50 g of crude rapeseed oil were mixed with 6.2 g of ethylene diamine containing 1 mole of water of crystallization per mole. To this mixture was added 1 g of anhydrous sodium carbonate. The mixture was intermittently stirred while being gradually heated within 1 hour to 220° C. Water vapour which was produced escaped and the colour of the reaction mixture turned dark. The hot viscous product was poured into a beaker, care being taken that no solid carbonate was entrained. 58.3% di-fatty acid diamide was isolated from the reaction product by extraction with water and ion exchange. Similarly, the di-fatty acid diamides can be obtained by reaction of free acids and the amine; in this case the subsequent purification step can be omitted.

Preparation of the surfactant

The ethylene diammonium soap of rapeseed fatty acids was prepared by mixing equivalent quantities of ethylene diamine and rapeseed fatty acids.

The reaction equation is

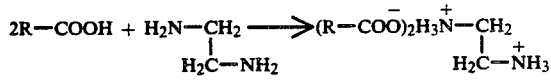

Emulsions A, B, C, D and E were prepared. Emulsions A and B were emulsions according to the invention. Emulsions C, D and E were comparative Examples of emulsions.

Emulsions A and B were prepared starting from water and a petroleum distillate of a boiling range of 40°–135° C., the proportion by volume of water: hydrocarbon being 1:9. The emulsions were prepared using as stabilizer 0.3% (weight by volume) of the diamides prepared as above, and as surfactant 0.3% (weight by volume) of the ethylene di-ammonium soap prepared as outlined above and a commercial emulsifier viz. a monoglyceride from safflower oil (Myverol 18–98). The emulsions were prepared by introducing the hydrocarbon together with the water into a glass cylinder and letting a small air current bubble from below through the water and hydrocarbon layers. The stabilizer and the surfactant were previously dissolved in the hydrocarbon while being heated to 80° C. The water phase was added to the hot hydrocarbon, immediately after which air was passed through to cool to 20° C. This was continued for 5 minutes. The emulsions were visually assessed immediately thereafter and then after 1 minute and after 5 minutes. The stable emulsions were again assessed after they were left standing for 24 hours. The relative height of the clear hydrocarbon layer which had formed over the emulsion, was taken as a measure for the stability of the emulsions.

The results are given in the following Table, which shows that on using a surfactant only or a diamide only, no stable emulsions are obtained. On using the diamide, both the commercial surfactant and the diammonium soap lead to a stable emulsion. The nature of the surfactant is therefore not critical, provided the diamide is present.

TABLE

| | | | Assessment | | | |
|---|---|---|---|---|---|---|
| | Surfactant | Stabilizer | directly | after 1 minute | after 5 minutes | after 24 hours |
| according to Example I | 0.3% mono-glyceride | 0.3% diamide | fine homogeneous emulsion | fine homogeneous emulsion | fine homogeneous emulsion | clear hydrocarbon layer <2% |
| | 0.3% di-ammo- | 0.3% diamide | fine homoge- | fine homogene- | fine homogeneous | clear hydrocarbon |

TABLE-continued

| | Surfactant | Stabilizer | Assessment directly | after 1 minute | after 5 minutes | after 24 hours |
|---|---|---|---|---|---|---|
| | nium soap | | neous emulsion | ous emulsion | emulsion | layer <2% |
| Comparative Examples | none | none | phase separation within some seconds | 2 phases | 2 phases | — |
| | 0.30% monoglyceride | none | fair looking emulsion | signs of phase separation | separation into a large hydrocarbon layer and a small water layer with emulsified boundary layer | — |
| | 0.3% di-ammonium soap | none | fair | phase separation | two phases with emulsified boundary layer | — |
| | none | 0.3% diamide | apparently homogeneous emulsion | separation into diluted top emulsion layer and more concentrated bottom emulsion layer | no further change | — |

EXAMPLE 2

A specific test method was developed for the assessment of various emulsions.

To this end the emulsion was given a quality factor "Q" which was calculated from the equation $$Q = \frac{100(A - X)(100 - A - Y)}{A(100 - A)^2}$$

in which

A = the dispersed amount of water expressed in percent by volume of the total mixture, X = the amount of water expressed in percent by volume of the total mixture, present in the lower A vol.% of the emulsion after having been allowed to stand for 24 hours.

and Y = the amount of clear hydrocarbon expressed in percent by volume of the total mixture, present in the upper part of the emulsion after having been allowed to stand for 24 hours.

This quality factor has a value 0 on complete phase separation of water and oil after 24 hours and a value 1 when the emulsion is still wholly homogeneous after 24 hours. It was established that to be useful for practical applications, the emulsions should have a Q value of about $\geq 7$. Emulsions were prepared consisting of about 88.5% of a petroleum fraction having a boiling range of 100°-160° C., 10% of water, 1% (weight by volume) of di-rapeseed fatty acid-ethylenediamide as stabilizer and 0.5% (weight by volume) of a surfactant. After 24 hours the Q value of the emulsions thus obtained were determined, using the above procedure. On using sorbitan monolaurate (Span 20) as surfactant, the Q value was 0.93, rapeseed fatty acid ethylene di-ammonium soap yielded a Q value of 0.95 and on using hexadecyl trimethyl ammoniumbromide (Cetavlon) the Q value was 0.96. The Q values without stabilizer were 0.30, 0.59 and 0.02 respectively.

EXAMPLE 3

An emulsion was prepared consisting of about 89% gasoline, 5% water, 5% xylene, 0.3% surfactant and 0.5% di-coconut fatty acid ethylenediamide as stabilizer. The surfactant consisted of a mixture of equal amounts of sorbitan monolaurate (Span 20), trioctylmethylammoniumchloride (Aliquat 336) and hexadecyltrimethylammoniumbromide (Cetavlon). In this process the gasoline, water and surfactant were homogenized for 2 minutes at room temperature, the hot solution of diamide in xylene was added while stirred, stirring being continued for another 1 minute. After 24 hours there was a very thin cream-like layer on the bottom. The Q value was 0.93.

On using di-birch tall resin ethylenediamide as stabilizer, an even more stable emulsion was obtained.

EXAMPLE 4

A water-in-gasoline emulsion (1:9 v/v) was prepared, using 0.6% by weight of ethanolammonium soap from coconut fatty acid and 0.25% by weight of di(hydrogenated tallow alkyl) dimethylammoniumchloride (the commercial product Arquad 2HT of 75% purity), which were first dissolved in the water phase and then added to the oil under stirring.

A fine, homogeneous emulsion was obtained which after 24 hours had a Q value of 0.85.

EXAMPLE 5

By the process of Example 4 an emulsion was prepared consisting of about 88.5% of a petroleum fraction having a boiling range of 100°-160° C., 10% by volume of water, 1.0% (weight by volume) of the ethanolammonium soap from palmoil fatty acids and 0.5% (weight by volume) Cetavlon (hexadecyltrimethylammonium bromide). The emulsion thus obtained had a Q value after 24 hours of 0.92.

EXAMPLE 6

By the process of Example 4 an emulsion was prepared, starting from 10 cm³ water and 90 cm³ gasoline, 0.6 g of the monoethanolamine salt from coconut fatty acids and 0.25 g di(coconut alkyl) dimethylammoniumchloride of 75% purity (the commercial product Arquad 2C). The emulsion thus obtained had a Q value after 24 hours of 0.94.

EXAMPLE 7

The recipe of Example 6 was repeated, but using 0.3 g of ($C_{12}$-$C_{16}$ alkyl)-benzyl-dimethyl ammoniumchloride (the commercial product Hyamine 3500). The emulsion thus obtained had a Q value after 24 hours of 0.96.

EXAMPLE 8

The recipe of Example 6 was repeated, using 0.75 g of the monoethanolamine salt from palmoil fatty acids and 0.25 g of di(coconut alkyl) dimethylammoniumchloride (the commercial product Arquad 2C of 75% purity). The emulsion thus obtained had a Q value after 24 hours of 0.97.

EXAMPLE 9

The recipe of Example 6 was repeated, using 1.5 g of the monoethanolamine salt of tall oil and 0.2 g di(-coconut alkyl) dimethylammoniumchloride (the commercial product Arquad 20 of 75% purity). An emulsion was obtained having a Q value after 24 hours of 0.99.

EXAMPLE 10

The recipe of Example 6 was repeated, using 1.2 g of tallow alkyltrimethylammoniumchloride of 50% purity (the commercial product Arquad T of 50% purity) and 0.4 g of ethanolammonium salt from coconut fatty acids. An emulsion was obtained having a Q value after 24 hours exceeding 0.9.

EXAMPLE 11

The recipe of Example 6 was repeated, using diesel oil instead of gasoline. In the present example were used 1.35 g of tallow alkyltrimethylammoniumchloride (the commercial product Arquad T of 50% purity) and 0.6 g of the ethylenedi-ammonium soap from rapeseed fatty acids. The Q value of the emulsion observed after 24 hours exceeded 0.9.

EXAMPLE 12

Under constant stirring an emulsion was prepared by dissolving 1.35 g of palmoil fatty acid diglycerides and 1.2 ml of pyridine in 90 ml kerosene. To this solution was added 0.27 ml of oxalyl chloride, followed by a solution of 0.72 g of lauryl alcohol-6,7 ethylene oxide condensate (surfactant) and 0.10 g of ethylenediamine in 10 ml of water. The stabilizer was formed by the following reaction scheme

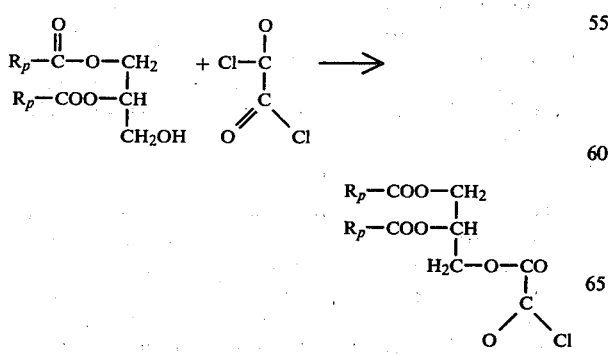

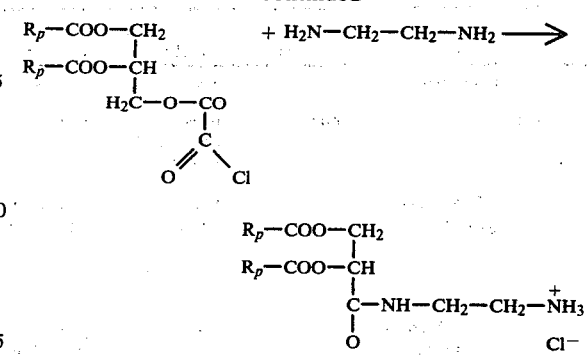

The emulsion had a Q value of 0.82.

EXAMPLE 13

A polymeric stabilizer was prepared from equimolar quantities of maleic acid anhydride and 1-octadecene in toluene at 110° C. under catalytic activity of 0.1% by weight of benzoyl peroxide. The toluene was evaporated to dryness and 0.5 g of the viscous material was dissolved in 90 ml of gasoline. 0.5 g of coconut ethanolammonium soap was subsequently added. Under constant stirring 10 ml of water in which was dissolved 0.05 ml of ethylene diamine were added. An emulsion was obtained with a Q value exceeding 0.80.

The stabilizer was formed by the following reaction scheme

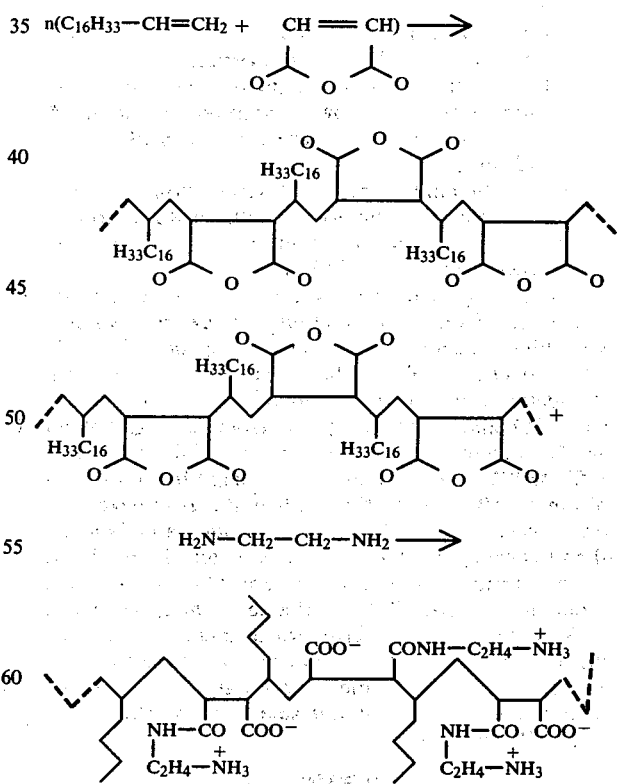

I claim:
1. Water-in-mineral oil emulsion comprising:
   (a) 1-50 vol.% of water,

(b) 99–50 vol.% of a mineral oil selected from the group consisting of gasoline, kerosene, diesel oil, heavy gasoline and fuel oil,
(c) an effective proportion of a surfactant, and
(d) a finely divided stabilizer which is substantially undissolved in the constituent phases of the emulsion and forms an interface between said phases, said stabilizer being a compound comprising at least one polar group having a dipole or being capable of forming a hydrogen bridge and at least 2 non-polar hydrocarbon groups containing at least 8 carbon atoms, said compound being selected from the group consisting of (i) a di- or tri-amide obtained by reacting a fatty acid with a compound containing 2 or 3 amino groups, (ii) the product obtained by reacting a mono-, di- and/or tri-alkanolamine soap derived from a natural or synthetic fatty acid and a quaternary ammonium salt comprising at least one substituent containing at least 8 carbon atoms, whereby the remaining substituents may consist of alkyl groups containing 1–3 carbon atoms, and (iii) a polymer obtained by reacting a polyalkyl anhydride with a compound containing at least 2 amino groups.

2. Water-in-mineral oil emulsion accordiang to claim 1, which comprises a stabilizer which has been formed in situ.

3. Water-in-mineral oil emulsion according to claim 1 or claim 2, wherein the average diameter of the particles of the finely divided stabilizer does not exceed 1/100 d, d being the average diameter of the emulsified water droplets which ranges from 0.1–25 microns.

4. Water-in-mineral oil emulsion according to claim 3, wherein the average diameter of the stabilizer particles ranges from 0.01 to 0.001 d and d ranges from 1 to 5 microns.

5. Water-in-mineral oil emulsion according to claim 1, in which the stabilizer consists of the product of the reaction between a fatty acid and ethylene diamine.

6. Water-in-mineral oil emulsion according to claim 1, which comprises a stabilizer obtained by reacting a mono-, di- and/or a trialkanolamine soap derived from a natural or synthetic fatty acid and a quaternary ammonium salt, comprising at least one substituent containing at least 8 carbon atoms, whereby the remaining substituents may consist of alkyl groups containing 1–3 carbon atoms.

7. Water-in-mineral oil emulsion according to claim 1, which comprises a stabilizer substantially free from ash-forming components.

8. Water-in-mineral oil emulsion according to claim 1, in which the stabilizer is present in a proportion ranging from 0.1–2 wt%.

9. Water-in-mineral oil emulsion according to claim 1, wherein the surfactant consists of one of the reacting surfactants which is present in excess of the stoichiometric proportions necessary for obtaining the stabilizer.

10. Water-in-mineral oil emulsion according to claim 1, wherein the surfactant is present in a proportion ranging from 0.1–2 wt%.

11. Water-in-mineral oil emulsion according to claim 1, which comprises 5–25 vol.% of water and 95–75 vol.% of fuel oil.

12. A process for preparing a water-in-mineral oil emulsion, which comprises producing an emulsion starting from:
(a) 1–50 vol.% of water,
(b) 99–50 vol.% of a mineral oil selected from the group consisting of gasoline, kerosene, diesel oil, heavy gasoline and fuel oil,
(c) an effective proportion of a surfactant, and
(d) a finely divided stabilizer which is substantially undissolved in the constituent phases of the emulsion and forms an interface between said phases, said stabilizer being a compound comprising at least one polar group having a dipole of being capable of forming a hydrogen bridge and at least 2 non-polar hydrocarbon groups containing at least 8 carbon atoms, said compound being selected from the group consisting of (i) a di- or tri-amide obtained by reacting a fatty acid with a compound containing 2 or 3 amino groups, (ii) the product obtained by reacting a mono-, di- and/or tri-alkanolamine soap derived from a natural or synthetic fatty acid and a quaternary ammonium salt comprising at least one substituent containing at least 8 carbon atoms, whereby the remaining substituents may consist of alkyl groups containing 1–3 carbon atoms, and (iii) a polymer obtained by reacting a polyalkyl anhydride with a compound containing at least 2 amino groups, said stabilizer being formed in situ.

13. A process according to claim 12, in which the stabilizer is formed in situ by dissolving it in either of the constituent phases of the emulsion or in the final emulsion and subsequently allowing the stabilizer to precipitate as finely divided particles, forming an interface between the water phase and the oil phase, by cooling the emulsion.

14. A process according to claim 12, in which the stabilizer is formed by allowing an anionic surfactant to react in situ with a cationic surfactant.

15. A process according to claim 12, in which a polymeric stabilizer is formed in situ.

* * * * *

UNITED STATES PATENT AND TRADEMARK OFFICE
CERTIFICATE OF CORRECTION

PATENT NO. : 4,395,266   Page 1 of 2
DATED : July 26, 1983
INVENTOR(S) : Kong W. Han It is certified that error appears in the above-identified patent and that said Letters Patent is hereby corrected as shown below:

Column 5, line 50, "7." should read --.7.--.

Column 7, lines 55-68, that portion of the formula reading $$\text{Cl}-\overset{\overset{O}{|}}{\underset{|}{C}} \quad \text{should read} \quad \text{Cl}-\overset{\overset{O}{\|}}{\underset{|}{C}} \quad \text{and that portion of the formula}$$

$$\text{reading} \quad \underset{O}{\overset{|}{C}}{\diagdown}_{Cl} \quad \text{should read} \quad \underset{O}{\overset{|}{C}}{\diagdown}_{Cl} \quad .$$

Column 8, lines 1-15, that portion of the formula reading $$\underset{O}{\overset{|}{\underset{|}{C}}}-\text{NH} \quad \text{should read} \quad \underset{O}{\overset{|}{\underset{\|}{C}}}-\text{NH} \quad .$$

UNITED STATES PATENT AND TRADEMARK OFFICE
CERTIFICATE OF CORRECTION

PATENT NO. : 4,395,266
DATED : July 26, 1983
INVENTOR(S) : Kong W. Han

It is certified that error appears in the above-identified patent and that said Letters Patent is hereby corrected as shown below:

Column 8, lines 35-64, those portions of the formula reading 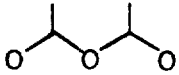 should read 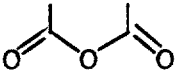 and those portions reading

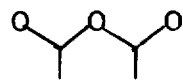    should read    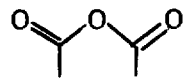

Claim 2, line 1, "accordiang" should read --according--.

Signed and Sealed this

Third Day of April 1984

[SEAL]

Attest:

Attesting Officer

GERALD J. MOSSINGHOFF
Commissioner of Patents and Trademarks